May 11, 1965 R. C. PETERZON-ARBELLA 3,182,958
APPARATUS FOR ERECTING A VERTICALLY EXTENDING CYLINDRICAL CASING
Filed Nov. 7, 1961 4 Sheets-Sheet 1

INVENTOR.
RODOLFO CARMELO PETERZON-ARBELLA
BY

ATTORNEY.

May 11, 1965  R. C. PETERZON-ARBELLA  3,182,958
APPARATUS FOR ERECTING A VERTICALLY EXTENDING CYLINDRICAL CASING
Filed Nov. 7, 1961  4 Sheets-Sheet 2

INVENTOR
RODOLFO CARMELO PETERZON-ARBELLA

BY
ATTORNEY

INVENTOR.
RODOLFO CARMELO PETERZON-ARBELLA
BY

ATTORNEY.

May 11, 1965 R. C. PETERZON-ARBELLA 3,182,958
APPARATUS FOR ERECTING A VERTICALLY EXTENDING CYLINDRICAL CASING
Filed Nov. 7, 1961 4 Sheets-Sheet 4

INVENTOR
RODOLFO CARMELO PETERZON-ARBELLA
BY *Albert M. Parker*
ATTORNEY

United States Patent Office 3,182,958
Patented May 11, 1965

3,182,958
APPARATUS FOR ERECTING A VERTICALLY EXTENDING CYLINDRICAL CASING
Rodolfo Carmelo Peterzon-Arbella, Goteborg, Sweden, assignor to Rodoverken Svenungson & Co., Goteborg, Sweden, a corporation of Sweden
Filed Nov. 7, 1961, Ser. No. 150,703
6 Claims. (Cl. 254—89)

This invention relates to a method of and an apparatus for erecting a vertically extending cylindrical casing.

There is disclosed in U.S. Patent No. 2,866,261 a system of erecting sheet metal tanks or casings from assembled plates by first making the base and roof of the tank or casing and an upper and lower casing part or cylindrical shell section composed of plates welded or otherwise joined together. The adjacent lower and upper edges of the parts extend along parallel helical lines, and the ends of each part consequently terminate in a vertical edge. The upper part can be rotated in relation to the lower part in the direction of the pitch of the helical line to form a gap between the vertical edges of the upper and lower parts, the length of the gap corresponding to that of a plate. A plate is inserted into this gap, and fixed to the upper casing part. By repeating this operation the height of the tank or casing can be progressively increased until it has obtained the desired height.

According to the aforesaid U.S. patent the upper casing part is rotated by means of a plurality of pinion gear motors.

When the full height of the tank has been reached in the method of U.S. Patent No. 2,866,261, a number of bolts are fitted between the casing parts, fittings for the bolts having been welded to the upper and lower parts. By means of the bolts the upper belt is raised so as to increase the height of the helical slot between these two parts whereupon the motors and associated supporting wheels can be dismantled (there is a motor for example for every other or every third supporting wheel); and subsequently the upper part is lowered and the tank completed by welding the upper and lower parts together.

The object of the present invention is to render possible the turning of the upper casing part along the said helical line in a more simple manner than by the pinion wheel gear motors, which are expensive and involve an appreciable complication.

It is another object of this invention to provide a more simple apparatus for lifting the upper casing part to permit the removal of the apparatus for turning the upper casing part.

The method according to this invention comprises stationarily supporting the upper casing part on the lower casing part, and extending a plurality of extensible levers inclined to the vertical and pivotable about axes radial to the casing axis into engagement with the upper casing part to lift the latter part. As the levers take the weight, they lift the upper part a very short distance from the lower part. The weight of the upper part then pivots the levers further away from the vertical; the extending levers move the upper part a further short distance from the lower part; and the weight of the upper part pivots the lever even further away from the vertical. Thus, as the levers are extended, they pivot progressively further from the vertical, and in pivoting they turn the upper casing part relatively to the lower casing part. When the levers are being extended, they pivot smoothly and consequently turn the upper casing part smoothly.

An embodiment of an apparatus for performing the invention is shown in the accompanying drawings.

Figure 4:
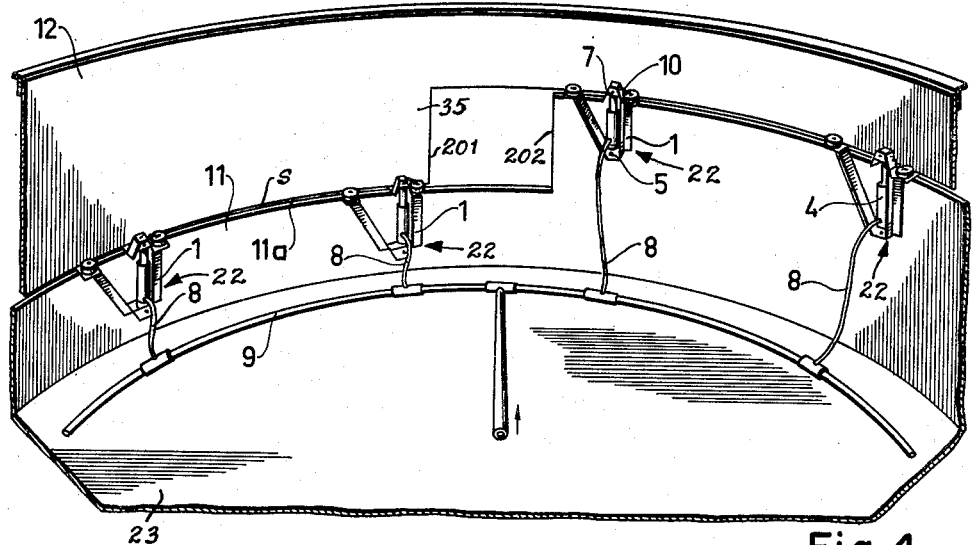
FIGURE 4 is a perspective view of a tank or casing illustrating the initial stages of construction of the tank or casing.
Figure 5:
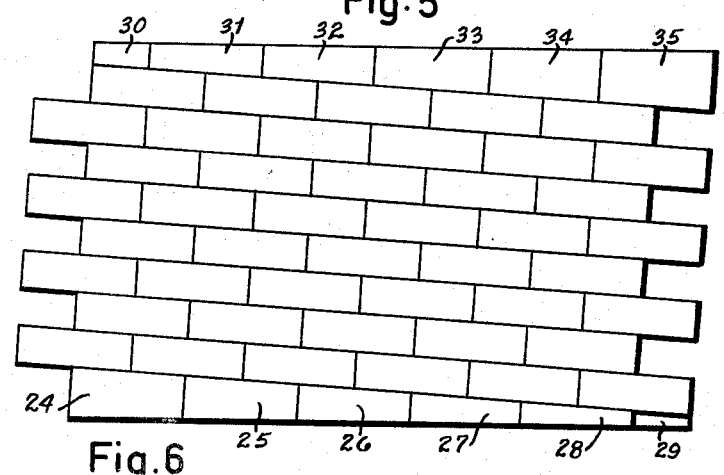
FIGURE 5 is a developed view of a series of belts of sheet plates.
Figure 6:
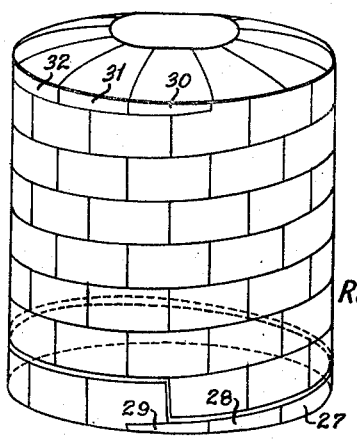
FIGURE 6 is a perspective view of an almost completed tank or casing.

The general principles of the method of constructing the tank or casing will first be described with reference to FIGURES 4 to 6.

The plates are prepared for the circular bottom 23, the convex head and the cylindrical casing. The size of each plate is such as to enable the casing to be assembled as indicated in FIGURE 5 which shows diagrammatically a developed casing. From FIGURE 5 it may be seen that in the closed casing the bottom and top edges of the plates form helical lines. The plates are bent in the usual manner in a bending machine but are introduced into it in a position inclined by the angle of pitch of the helical line of the casing belts.

The bottom 23 (FIGURE 4) of the tank or casing is first assembled and welded to a base (not shown). Thereupon the lower casing part formed by the plates 24 to 29 (FIGURE 5) is welded to the upper periphery of the bottom 23, the top or upper edge of this belt or lower casing part forming the first turn of a helix.

Figure 1:
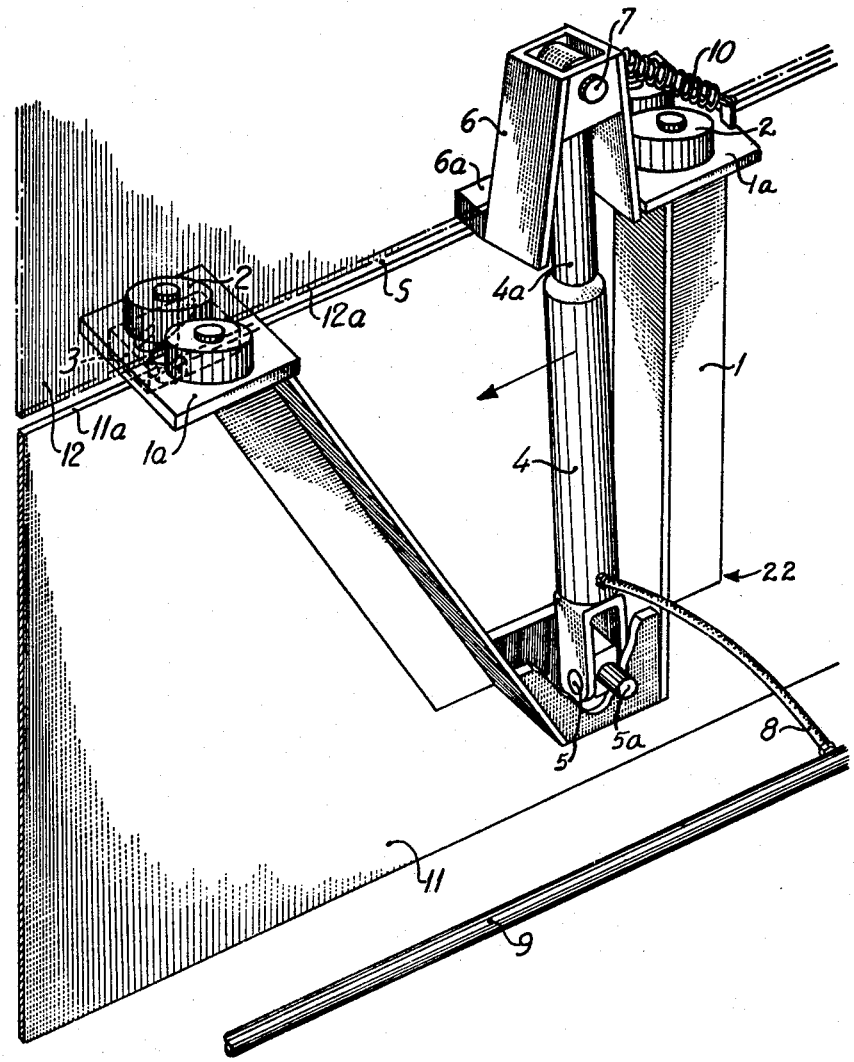
FIGURE 1 shows a front view of the apparatus.

A plurality of lever apparatus 22 are then suspended from the top or upper edge of the belt or lower part 11 as is described later with reference to FIGURE 1.

The top belt or upper part 12 of the casing formed initially from the plates 30 to 35 (FIGURES 5 and 6) is then assembled on the lever apparatus 22 and the convex head of the tank or casing is thereafter assembled and attached to the upper part 12. The lower edge of the upper casing part also forms the first turn of a helix, so that the upper and lower parts are divided by a slot S in the form of one turn of a helix; the ends of each helical turn terminate in a vertical edge as shown at 201 and 202.

Figure 3:
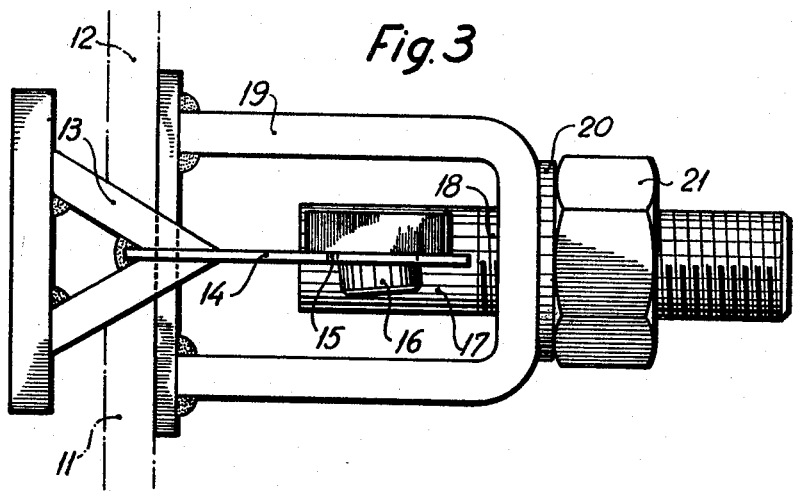
FIGURE 3 shows a wedge apparatus for facilitating the welding of the upper belt or casing part to the lower belt or casing part in the final stage of erecting the tank.

The lever apparatus are then operated as described later to turn the upper part 12 about the axis of the tank or casing so that the vertical edge 201 of the plate 35 moves away from the edge 202. A plate is then inserted into the resulting gap and secured to the fixed plates of the tank. This operation is then repeated until the tank or casing reaches the desired height (FIGURE 6). The joining together of the upper and lower parts or belts 11 and 12 is described below with reference to FIGURE 3.

Figure 1A:
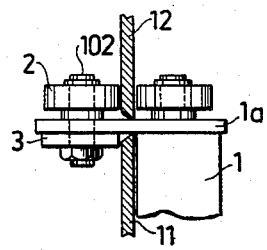
FIGURE 1a is a fragmentary view in vertical section through plates of the wall being formed, the section being taken along the vertical plane to the right of the member 1 in FIG. 1 looking to the left, portions of the apparatus bearing guide rollers being shown in elevation.
Figure 1B:
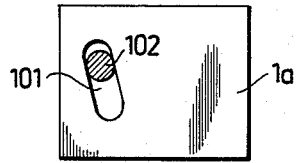
FIGURE 1b is a fragmentary view in plan of the abutment 1a with the shaft for the adjustable guide roller being shown in horizontal section.

As can be seen from the drawings the lever apparatus 22 according to the invention consists of a V-shaped support or rigid member 1 which abuts the internal side of the lower casing part or cylindrical shell section 11 and is suspended at the top from the edge 11a of said part or shell by means of two abutments 1a. Each of the abutments carries a pair of guide rollers 2 between which the upper casing part or cylindrical shell section 12 runs. Beneath the abutments 1a on the rear side of the belts a locking shoulder 3 is attached to each abutment 1a. This shoulder prevents the support or member from moving radially relatively to the belts or casing parts and is preferably removable for facilitating removal of the apparatus. Furthermore, the locking shoulder may be adjustable so that, when the support of the apparatus is locked, it may be adjusted to the thickness of the lower belt 11. This adjustability may be achieved for example by fixing the locking shoulder to a bolt 102 (FIG. 1a) serving as a shaft for one guide roller in each pair of rollers; the shaft 102 is then movable in an inclined groove 101 in abutment 1a renders possible adjustment and fixing of the locking shoulder and the above-mentioned guide roller at the desired distance from the other guide roller in the same pair. A hydraulic cylinder 4 having a piston rod 4a forms an extensible lever and is mounted on a pivotal mounting 5a, 5 at the apex of the support 1; this mounting permits the hydraulic cylinder to swing in two planes perpendicular to each other; one pivotal axis is radial to the axis of the casing, while the other is tangential to the casing. At the upper end of the piston rod 4a a lifting head 6 is mounted on a joint 7, which permits swinging in the vertical plane or about an axis radial to the axis of the casing. The lifting head 6 engages the lower edge 12a of the upper belt 12; and a support flange 6a of the lifting head is adapted to run freely in this slot when the upper casing part is carried by the abutments 1a.

A suitable number of lever apparatus 22 of the type just described is mounted around the tank or casing, spaced apart, for example, by a distance of about 3 metres. Each hydraulic cylinder is connected, for example, by a flexible pipe 8 to a manifold 9 to which a hydraulic liquid pump is connected. The manifold may consist of a number of steel pipes screwed together. Another method is to use a flexible manifold having fitted T-pieces, which can be connected directly to the cylinders 4 by quick-release couplings. In this way the manifold will hang between the assemblies, so that, which is desirable from many points of view, the floor of the tank will be maintained free of pipes. The levers may of course be extended pneumatically or mechanically.

When hydraulic pressure is connected, the flange 6a of the lifting head 6 raises the upper belt or casing part 12. The hydraulic cylinder 4 and consequently the lever is inclined somewhat to the vertical plane in the initial position so that when the lever raises the upper part, the weight of the upper part pivots the levers further from the vertical about the axes radial to the casing axis (to the left in FIGURE 1).

The levers, when they are initially extended, raise the upper part 12 a very small vertical distance just sufficient to reduce friction between the abutments 1a and the lower edge of the upper part 12 to permit the levers to pivot further away from the vertical. As the levers swing, the levers are further extended to maintain the friction just below that which would prevent pivoting of the levers. As the levers are pivoted by the weight of the upper part and are extended they turn the upper part 12 about the axis of the casing, and also raise it by a distance equal to the vertical distance between the abutments 1a on the helix. The levers also pivot inwardly about the axes tangential to the casing to allow for the curvature of the casing. As the upper part turns, it is guided between the rollers 2.

The whole apparatus is so arranged that when the piston rod 4a has completed its operative stroke, the pivoting movement of the lever is stopped by the lifting head 6 abutting the other abutment 1a (see the direction of the arrow in FIGURE 1), and the supply of hydraulic liquid to the cylinder is simultaneously cut off. A spring mounted in the latter cylinder or any equivalent means pulls the piston back to its starting position at the same time as a spring 10 returns the whole of the hydraulic mechanism and the lifting head 6 to the starting position shown in FIGURE 1.

Figure 2:
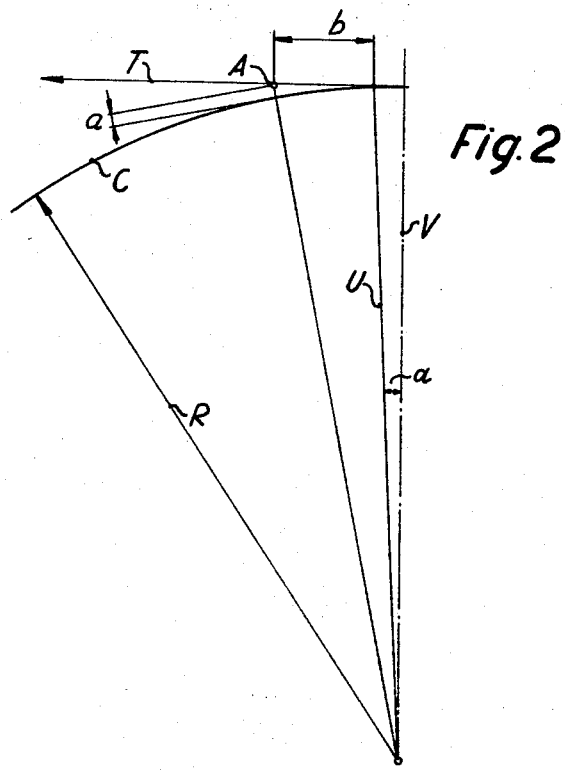
FIGURE 2 shows a diagram of the lifting movement of the levers.

The movement just described is shown diagrammatically in FIGURE 2. The lateral movement of the lifting head 6 follows the tangent T to the circle C whose radius R corresponds to the distance between the upper and lower pivotal joints of the lever when the latter is in the vertical position V. If this radius R is for example 600 mm. and the initial inclination $\alpha$ of the lever in the starting position V is 3°, the ratio between the length of the stroke $a$ of the hydraulic piston rod 4a and the length of the lateral movement $b$ will be $a:b$, the end position of the movement being designated by A. By selecting the value of this ratio $a:b$ it is possible by supplying a small quantity of hydraulic liquid to the cylinder to obtain to obtain a relatively large lateral movement $b$. This is of significance in the manufacture of large tanks, when a plurality of lifting or displacing assemblies according to the invention are to be connected. It is possible even in this case to obtain the desired displacement or lifting speed with a relatively small manifold 9 and with a pump of low capacity.

The dimensions of the abutments 1a and lifting head 6 are suited to the permitted surface pressure at the edge of the upper casing part or belt 12. Thus, there is no need for any reinforcement plates similar to those in the apparatus according to the abovementioned U.S. patent.

Whilst a large distance of about 350 mm. is required between the upper and the lower belt or casing parts when using the known pinion gear motors, this distance can be reduced to about 30 mm. with a hydraulically extensible lever apparatus according to the present invention. The large distance has a disadvantageous effect on the belt when the tank being built is exposed to the force of a wind.

The lowering of the upper belt or casing part 12 by means of bolts according to the U.S. patent takes a long time owing to the appreciable distance between the upper and the lower belt or casing part. According to the present invention this lowering may be effected in a considerably simpler manner by means of a number of wedge apparatus shown in FIGURE 3. This apparatus replaces the bolt during lowering of the upper belt, and it does not require, as the bolt mentioned above does, any securing members welded to the belt. The apparatus consists of a wedge 13 which is fitted in the slot 5 between the upper and the lower belts or parts 12 and 11 respectively. The wedge 13 is provided with an extension flange or flat bar 14 having one or more openings 15 by means of which the wedge can be hooked on to studs 16, which are fixed to a holder 17; the holder is carried by a bolt 18, which projects through a hole in a U-shaped bracket 19. Outside this bracket the bolt 18 is provided with a washer 20 and a nut 21. The wedge 13 is adapted to be inserted from the interior side of the belts, whilst the bracket 19 and associated bolt device is located outside the belts. When the nut is tightened, it engages the bracket 19 by means of the washer 20, and this bracket in its turn engages the belts 11 and 12, whereby the wedge is forced between the edges 11a and 12a respectively of the belts.

The hydraulically extensible lever apparatus described above may now be dismantled. As a rule the dismantling occurs only once during the erection of the tank, namely when the tank has reached its full height and the upper part of the tank is to be joined to its lower part. The wedge 13 is inserted into the slot 5 between the upper and lower parts and the height of the slot is increased sufficiently by screwing up the nut 21 of every wedge (there are of course several such wedges). Then the lever apparatus are dismantled, and the nuts 21 unscrewed so that the wedges slide out of the slot 5 between the belts, whereby the upper belt 12 sinks downwardly and comes to rest on the flat bars 14, which may serve as spacers for obtaining a suitable slot opening for the subsequent welding between the two belts or casing parts. As the welding progresses the wedges are dismantled by means of a crowbar.

The invention is not limited to the embodiment shown and described above but may be modified in various ways without departing from the inventive idea. Two manifolds which each connected to alternate displacement assemblies, may be used whereby, by supplying oil alternatively to the two manifolds in such a way that the intervals overlap, a continuous displacement or rotation of the upper casing part may be achieved.

The total weight of each lever apparatus may for example be a maximum of 50 kg., and it can consequently be handled manually without any great difficulty.

What I claim is:

1. An apparatus for use in the erection of a vertically extending cylindrical casing, to turn an upper casing part relatively to a lower casing part divided from said upper part by a slot in the form of one turn of a helix, and comprising a lever, an abutment for supporting said upper part upon said lower part and located between said parts, means for suspending said lever from said abutment, said lever being pivotally mounted on said means about an axis substantially radial to the axis of said casing, stops for limiting pivotal movement of said lever between two positions on the same side of the vertical, and means for extending said lever into engagement with the bottom edge of said upper casing part.

2. An assembly for use in the erection of a vertically extending cylindrical casing, to turn an upper casing part relatively to a lower casing part divided from said upper part by a slot, in the form of one turn of a helix and comprising a source of fluid under pressure; a plurality of lever apparatus adapted to be spaced around the circumference of said casing, each of said apparatus comprising a lever extensible by fluid under pressure into engagement with the bottom edge of said upper part, a pivotal mounting for said lever, means for supporting said pivotal mounting in a fixed position on said lower casing part such that said lever is pivotable about an axis radial to said casing; abutment means for stopping the pivoting of the lever in an initial position at a small angle from the vertical on one side thereof, and conduits connecting all of said lever apparatus to said source, whereby in operation, simultaneous extension of said levers will lift said upper casing part, and the weight of said upper casing part will pivot said levers further from the vertical on the same side thereof, said lever then turning said upper part relatively to said lower part.

3. An assembly for use in the erection of a vertically extending cylindrical casing, to turn an upper casing part relatively to a lower casing part divided from said upper part by a slot in the form of one turn of a helix and comprising a source of liquid under pressure; a plurality of lever apparatus adapted to be spaced around the circumference of said casing, each of said apparatus comprising a lever extensible by liquid under pressure into engagement with the bottom edge of said upper part, a pivotal mounting for said lever such that said lever is pivotable about two mutually perpendicular axes, one of said axes being in use radial to said casing axis, and the other axis being tangential to said casing, and means for supporting said pivotal mounting in a fixed position on said lower casing part such that said lever is pivotable about an axis radial to said casing, said means comprising two abutments circumferentially spaced apart in use and carried by said lower casing, and a member interconnecting said abutments, said pivotal mounting being fixed to said member; and conduits connecting all of said lever apparatus to said source.

4. An assembly which in the erection of a vertically extending cylindrical casing is adapted to turn an upper casing part relatively to a lower casing part divided from said upper part by a slot in the form of one turn of a helix and which comprises a source of fluid under pressure; a plurality of lever apparatus adapted to be spaced around the circumference of said casing, each of said apparatus comprising a lever extensible by fluid under pressure into engagement with the bottom edge of said upper part, a pivotal mounting for said lever, and means for supporting said pivotal mounting in a fixed position on said lower casing part such that said lever is pivotable about an axis radial to said casing, said means comprising a frame suspended from the top edge of said lower casing part, said pivotal mounting being fixed to said frame, and said frame including means to prevent said lever from pivoting into a vertical position, and conduits connecting all of said lever apparatus to said source, whereby in operation, simultaneous extension of said levers lifts said upper casing part, and the weight of said upper casing part pivots said levers, said levers then turning said upper part relatively to said lower part.

5. An apparatus for use in the erection of a vertically extending cylindrical casing, to turn an upper casing part relatively to a lower casing part divided from said upper part by a slot in the form of one turn of a helix and comprising a pair of spaced apart abutments adapted in use to be carried by said lower casing part and to support said upper casing part; a rigid member interconnecting said abutments; a lever having a longitudinally extensible portion and being pivotally mounted on said member about two mutually perpendicular axes, the first of said axes, in use, being radial to said casing axis and the second of said axes being tangential to said casing, said abutments forming pivoting stops for said lever and being so located relatively to the pivotal mounting of said levers as to prevent said lever, in use, from pivoting into a vertical position; means for extending said extensible portion of said lever; a lifting head pivotally connected to said extensible portion of said lever about an axis parallel to said first axis and adapted in use, to engage the bottom edge of said upper part; and means biasing said levers towards the one of said abutments closer, in use, to the vertical through said pivotal mounting.

6. An apparatus for use in the erection of a vertically extending cylindrical casing, to turn an upper casing part relatively to a lower casing part divided from said upper part by a slot in the form of one turn of a helix and comprising a pair of spaced apart abutments adapted in use to be carried by said lower casing part and to support said upper casing part; a V-shaped rigid member interconnecting said abutments and located on one side of said casing; a shoulder adjustably mounted on each of said abutments and adapted to engage the opposite side of said casing to said member; a pair of rollers mounted about vertical axes on each of said abutments and adapted to receive said upper casing part; a lever having a longitudinally extensible portion and being pivotally mounted at the apex of said V-shaped member about two mutually perpendicular axes, the first of said axes, in use, being radial to said casing axis and the second of said axes being tangential to said casing; pivoting stops for said lever such as to prevent said lever, in use, from pivoting into a vertical position; hydraulic means for extending said extensible portion; a lifting head pivotally connected to said extensible portion of said lever about an axis parallel to said axis and adapted in use to engage the bottom edge of said upper part; and means biasing said levers towards the one of said stops closer, in use, to the vertical through said pivotal mounting.

References Cited by the Examiner

UNITED STATES PATENTS

| | | | |
|---|---|---|---|
| 2,505,847 | 5/50 | Anuszkiewicz | 254—104 |
| 2,605,540 | 8/52 | Kroll et al. | 29—429 |
| 2,732,177 | 1/56 | Ludowici. | |
| 2,757,903 | 8/56 | Bill | 254—93 X |
| 2,836,054 | 5/58 | Brauer. | |
| 2,866,261 | 12/58 | Macku | 29—429 |
| 2,901,217 | 8/59 | Boyle | 254—104 |
| 2,993,679 | 7/61 | Morgan | 254—89 |
| 3,096,077 | 7/63 | Forsyth | 254—93 |

WILLIAM FELDMAN, *Primary Examiner.*

MILTON S. MEHR, NEDWIN BERGER, *Examiners.*